United States Patent Office 3,567,187
Patented Mar. 2, 1971

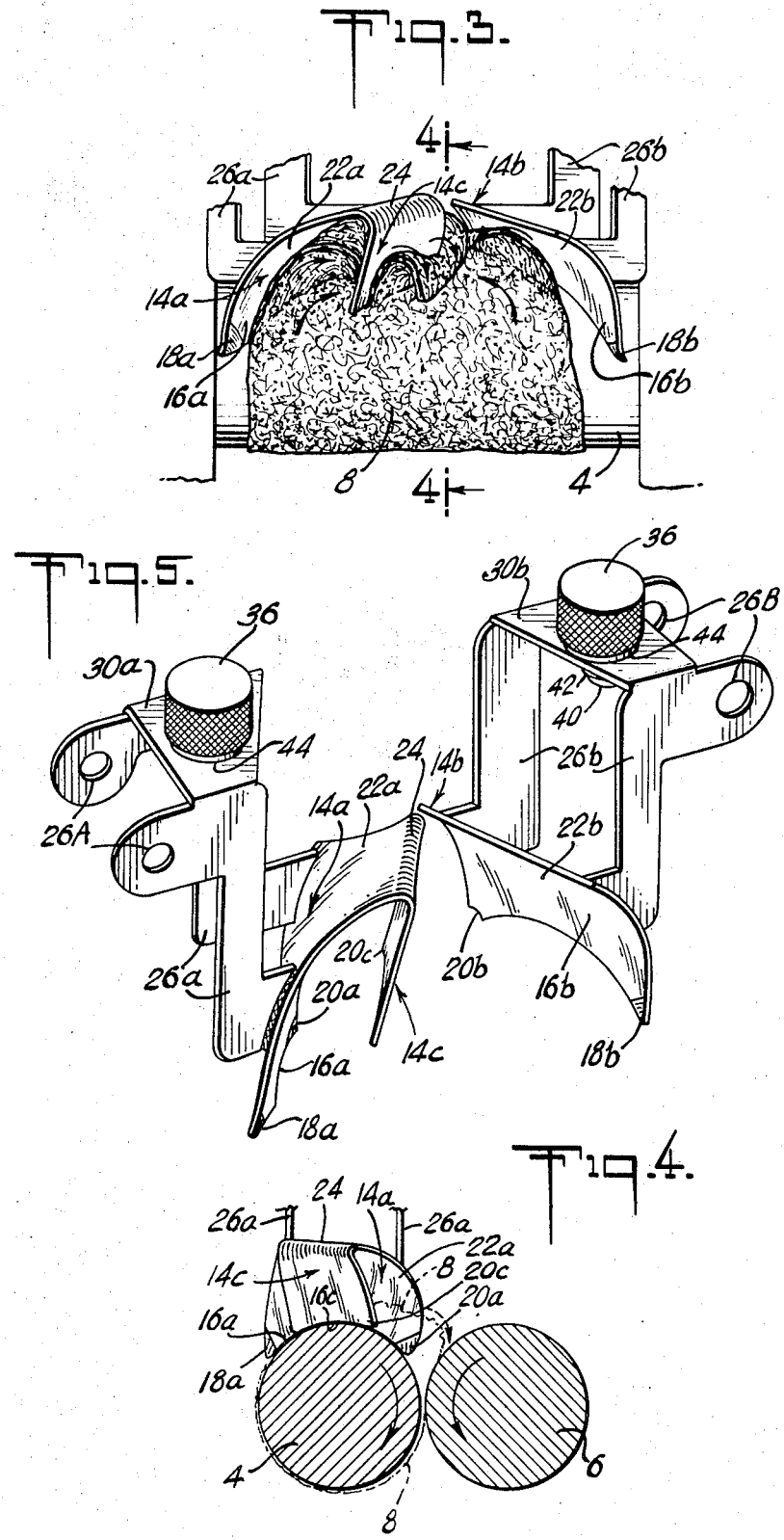

3,567,187
ROLL MILL SCRAPER BLADES
Michael P. Antalek, Fishkill, and Raymond J. Tetrault, Wappingers Falls, N.Y., assignors to Texaco Inc., New York, N.Y.
Filed Dec. 20, 1968, Ser. No. 785,581
Int. Cl. B01f 15/00
U.S. Cl. 259—2                                22 Claims

ABSTRACT OF THE DISCLOSURE

In cooperation with a roll mill having a spaced apart feed roll and a kneading roll forming nip rolls for blending two or more ingredients into a homogeneous mixture, a pair of cooperating scraper blades which continuously remove the ingredients after passing thru the space between the nip rolls, from the surface of the feed roll and return a newly exposed surface of the ingredients to the center of the feed roll.

BACKGROUND OF THE INVENTION

The present invention relates to a method of and an apparatus for homogeneously milling ingredients into a product and specifically to a method and an apparatus for homogeneously milling ingredients heated by a feed roll into a product.

It has been known to mill two or more ingredients with a roll mill to form a final homogeneous product. For example, an antioxidant and/or a plasticizer have been milled into a polyvinyl chloride, a polyethylene or a polypropylene. Another example of forming a final homogeneous product by milling is the milling of glass wool into a plastic to reinforce the plastic.

The ingredients are introduced in the form of particulate matter, chunks, liquids or otherwise to the nip rolls of a roll mill which mills the components as they pass between the closely spaced rolls. Heat is conducted to the ingredients from the feed roll, the latter being maintained, for example, at a temperature of up to 800° F. by known means such as an electrical heating unit or by circulating a heated liquid such as oil through the feed roll. The heat enables the ingredients to adhere to the feed roll during milling and increases the pliability of the ingredients.

As used in the specification and claims, the term plastic refers to polymers, condensation polymers, macromolecules, resins, elastomers and plastics having a high modulus of elasticity at the temperature at which the ingredients are to be milled.

For the roll mill to produce good homogeneity of the product a different surface must be continually exposed during each successive pass between the nip rolls.

In the past, the partially blended ingredients were removed from the feed roll after each succesive pass through the space between the nip rolls and then manually folded and returned with a new surface exposed to the feed roll. This method temporarily separates the source of heat from the ingredients permitting the ingredients to cool and stiffen. Various ingredients can thus be cooled to a temperature wherein they become too stiff to readily intermix by milling and/or too cool to adhere to the roll mill upon leaving the nip rolls.

With this type of manual milling operation it is necessary to have an operator present continuously.

SUMMARY OF THE INVENTION

It is thus an object of the present invention to automatically expose a different surface of the partially blended ingredients to the feed roll of a roll mill after each pass through the nip rolls thereof.

It is another object of the present invention to automatically fold the partially blended ingredients on the feed roll of a roll mill onto themselves while the ingredients are maintained at a predetermined elevated temperature.

It is a further object of the present invention to limit the operator time required to expose a different surface of the ingredients to the feed roll of a roll mill.

In accordance with the present invention there is described a method of mixing a plurality of kneadable ingredients into a predetermined homogeneous product by the use of a pair of spaced rotating rolls onto which the ingredients are introduced and including a feed roll and a kneading roll. The method comprises feeding a predetermined amount of ingredients into the nip of the rolls, forcing the material through the nip, and retaining the material on the surface of the feed roll and away from the kneading roll as the material leaves the nip. The method further comprises progressively lifting the outer portions of the material from the feed roll, folding the lifted portions upon themselves, and forcing the folded ingredients through the nip of the rolls to knead the ingredients whereby the ingredients are intermixed and rekneaded by the mill rolls.

BRIEF DESCRIPTION OF THE DRAWING

FIG. 3 is a perspective view of the cooperating scraper blades in the process of removing ingredients from the feed roll;

FIG. 4 is a section through the middle of the nip rolls viewing the side of one of the scraper blades with its unitary auxiliary scraper blade;

FIG. 5 is a perspective view of the cooperating scraper blades alone in accordance with our invention.

BRIEF DESCRIPTION OF THE PREFERRED EMBODIMENT

Figure 1:
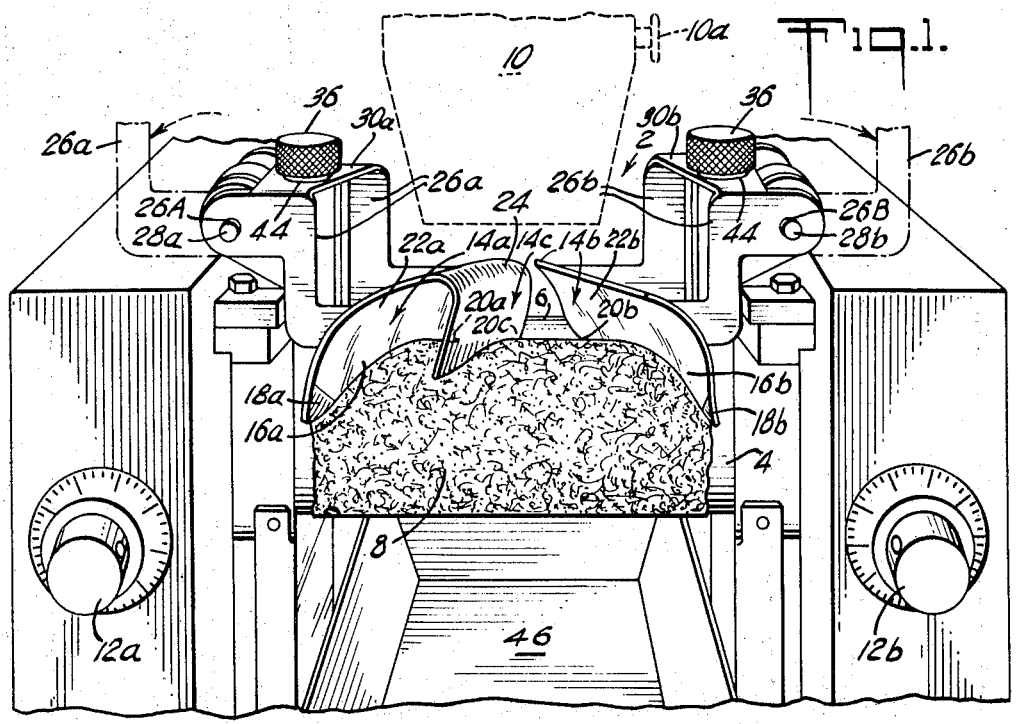
FIG. 1 is a perspective view of an embodiment of our invention viewed from the leading edge of the cooperating scraper blade in accordance with our invention.

Referring to the drawing, a roll mill is generally disclosed at 2 having nip or mill rolls comprising a spaced apart first or feed roll 4 and kneading roll 6 travelling at different surface speeds and forming a nip between them. Material or ingredients 8, for example, fillers, additives such as an antioxidant and a plasticizer, and plastics, are added to the nip rolls, for example from a hopper 10 positioned above the nip rolls and having a control 10a for metering out a predetermined amount of ingredients 8 (the hopper 10 and the control 10a are not meant to limit the means by which the ingredients 8 are brought to the nip rolls, but are only exemplary and do not form part of the present invention). Ingredients 8 which are added are milled between the nip rolls.

Heat is conducted to the ingredients 8 being milled, from the feed roll 4 which is maintained at an elevated temperature of up to 800° F. by electrical energy or otherwise. At these elevated temperatures, the ingredients adhere to the feed roll and are sufficiently plastic to be milled into a homogeneous product, by causing the ingredients 8 to be passed a sufficient number of times through the nip rolls, for example, from 50 to 350 passes. During each pass a different surface is exposed to the nip rolls for thorough milling. As the ingredients 8 pass between the nip rolls, they are intimately milled with a shearing, compressive load and spread axially onto the feed roll 4 to which they adhere at the elevated temperature. The space between the nip rolls can be varied by calibrated control dials 12a and 12b, as is well known in the art, to conform the space between the nip rolls to the material being milled.

The ingredients 8, after passing between the nip rolls, adhere to the feed roll 4 because of the hotter surface creating a tackier ingredient surface adjacent the feed roll 4 and because the kneading roll 6 is rotating at a faster speed thus pushing the ingredients toward the feed roll 4.

In an embodiment of the present invention, a pair of cooperating scraper blades 14a and 14b are used to expose a new surface of the ingredients 8 to the nip rolls during each pass therethrough. The cooperating scraper blades 14a and 14b are positioned with their shares 16a and 16b, respectively, adjacent the feed roll 4. The plane of the surface of the shares 16a and 16b is spiral. The pitch of the shares 16a and 16b can be from ¾ to 1½ times the axial length of the feed roll 4 and, for example, in the described embodiment is the axial length of the feed roll 4. The length of the shares 16a and 16b from the leading edges 18a and 18b, respectively, to the trailing edges 20a and 20b, respectively, is less than 180° or less than one-half the pitch, and in the present example is 160°. In the exemplified embodiment, the feed roll 4 is 3 inches in diameter and axially 7 inches in length. The kneading roll 6 has the same dimensions, but is not necessarily limited thereto. As can be seen most easily in FIG. 1, the leading edges 18a and 18b are positioned at opposite ends of the feed roll 4 and the trailing edges 20a and 20b are positioned near the middle of the feed roll 4. The bottom edges of the shares are bevelled in the present embodiment.

The planes of the shares 16a and 16b form an acute angle with a normal to the surface of the feed roll 4, so that an incision is started by the leading edges 18a and 18b between the ingredients 8 and the feed roll 4. As the feed roll 4 advances, the ingredients 8 are progressively separated therefrom by a cutting action from the cooperating scraper blades 14a and 14b. Moldboards 22a and 22b of the cooperating scraper blades 14a and 14b, respectively, are concave facing the axial center of the feed roll 4. The leading edges of the moldboards 22a and 22b slope progressively toward the trailing edges from the bottom to the top of the moldboards. The shares 16a and 16b are joined at their top edge to the bottom edge of the moldboards 22a and 22b, respectively, integrally or otherwise. The ingredients progressively separated from the rotating feed roll, are guided by the concave surfaces of the moldboards 22a and 22b over and onto themselves starting out at both ends of the feed roll 4 adjacent the leading edges 18a and 18b and continuing on toward the center of the feed roll 4.

The scraper blades 14a and 14b in the exemplary embodiment of the present invention, are formed out of a right circular cylinder viz. 2½ inch diameter commercial pipe with the shares 16a and 16b, thereof, given a spiral twist from the leading edges 18a and 18b, respectively, to the trailing edges 20a and 20b, respectively.

The function of the cooperating scraper blades 14a and 14b is to progressively separate the ingredients 8 being kneaded from the rotating feed roll 4 to which they adhere, starting at both ends of the feed roll 4 and continuing toward the center. The separated ingredients 8 are guided toward the center of the feed roll 4 in the direction the feed roll 4 is rotating to mix the ingredients 8 thoroughly just before the ingredients 8 are milled between the nip rolls and flattened axially along the surface of the feed roll 4. As the feed roll 4 is rotating constantly during milling, this action of separating the ingredients from the feed roll 4, guiding the ingredients 8 toward the center of the feed roll 4 and milling the ingredients 8 between the nip rolls, is repetitive.

It has been found useful to join an auxiliary scraper blade 14c either compositely or integrally to the top of one of the moldboards, for example, moldboard 22a. The auxiliary scraper blade 14c is held in place between the cooperating scraper blades 14a and 14b by a support wing 24 which is fabricated from a nonresilient material and is cantilevered from the top of the moldboard 22a out toward the opposite cooperating scraper blade 14b. The auxiliary scraper blade 14c is joined to the unsupported edge of the support wing 24 and hangs therefrom. The support wing 24 can be a composite with the auxiliary scraper blade 14c or as in the exemplary embodiment of the present invention, integral therewith. In the exemplary embodiment, the support wing 24 continues the right circular cylindrical shape of the moldboard 22a but axially is progressively shorter toward the unsupported edge. In this manner the transition from the moldboard 22a to the support wing 24 is smooth preventing any buildup thereon of the ingredients 8 removed from the feed roll 4. The leading edge of the support wing 24 continues the progressive slope of the leading edge of the moldboard 22a toward the trailing edge thereof.

The auxiliary scraper blade 14c is flat. It has a bevelled leading edge which slopes slightly inward from the bottom, adjacent feed roll 4 to where it joins with the support wing 24. The bottom edge is adjacent the feed roll 4 and is curved for a spiral fitting therewith. The length of the spiral is from 30° to 120° of a full pitch and the pitch of the auxiliary scraper blade 14c is equal to the pitch of the scraper blades 14a and 14b. The length of the spiral in the present embodiment is 60° of a full pitch. The plane of the auxiliary scraper blade 14c is parallel to the plane of the scraper blade 14a.

The function of the auxiliary scraper blade 14c is to separate the ingredients 8 from the surface of the rotating feed roll 4 near the center thereof and to urge the removed ingredients 8 toward the opposite scraper blade 14b as the advancing feed roll 4 continuously carries the ingredients 8 along its surface.

In one embodiment, the trailing edge 20b of the scraper blade 14b just overlaps near the axial center of feed roll 4, with the trailing edge 20c of the auxiliary scraper blade 14c. The length of the auxiliary scraper blade 14c is axially shorter than the scraper blade 14a so that an opening is left for the ingredients to pass through to the nip rolls. Thus the ingredients 8 adhereing to the central portion of the feed roll 4 are separated therefrom and mixed on themselves before being milled between the nip rolls.

The cooperating scraper blades 14a and 14b and when present, auxiliary scraper blade 14c can be coated with a nonsticking surface such as wax or tetrafluoroethylene, to prevent the ingredients from sticking to the surface thereof.

Cooperating scraper blades 14a and 14b and when present, auxiliary scraper blade 14c, are pivotally mounted adjacent the mill rolls by means of support arms 26a and 26b which are fixedly attached at their lower ends to the convex surfaces of scraper blades 14a and 14b, respectively, by welding or other known means and pivotally attached at their upper ends to the frame of the roll mill 2, through pins 28a and 28b.

The pins 28a and 28b fit in slots formed in the frame of the roll mill 2 opposite and above either end of the feed roll 4 and in circular openings 26A and 26B, respectively, formed in the upper ends of support arms 26a and 26b, respectively.

The pins 28a and 28b are prevented from moving axially out of the slots in the frame of the roll mill 2 and the circular openings 26A and 26B, respectively, by flattening the ends thereof to a larger diameter than the circular openings or by other known means.

It is within the concept of the present invention that the support arms 26a and 26b can have a wide variety of shapes. In the exemplary embodiment, the support arms 26a and 26b, are machined from flat stock having a rectangular central body with a foot extending in opposite directions from both the bottom and the top thereof. One foot of each support arm 26a and 26b connects to the convex side of a cooperating scraper blade 14a and 14b, respectively. The other foot of each support arm 26a and 26b is formed with the circular openings 26A and 26B respectively therein. For greater rigidity, the support arms 26a and 26b may be multiple support arms, spaced apart with flat rigid plates 30a and 30b, respectively, welded to similar portions of the connected support arms 26a and 26b, respectively, for example, to the top edges of the feed with the circular openings 26A and 26B, respectively, therein. With a multiple support arm the pins 28a and 28b pass through each circular opening 26A and 26B, respectively, of the multiple support arms 26a and 26b, respectively.

Figure 2:
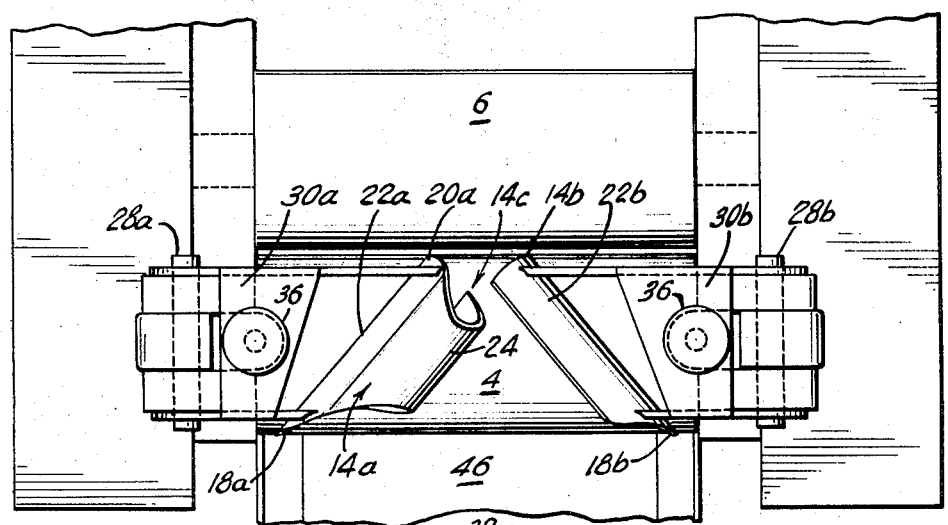
FIG. 2 is a plan view of the same embodiment shown in FIG. 1.
Figure 6:
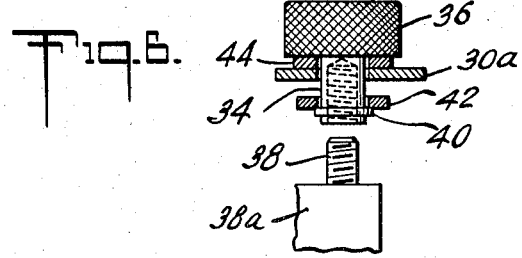
FIG. 6 is a sectional elevation of a fastener in accordance with our invention.

As can be seen especially in FIGS. 2 and 5, when multiple support arms 26a and 26b are used, the feet nearer the trailing edge of the cooperating scraper blades 14a and 14b, respectively, are longer than those nearer the leading edge thereof. As can be seen in FIG. 2, this is because the line of contact with the support arms 26a and 26b and the scraper blades 14a and 14b, respectively, and the axis of the pins 28a and 28b, respectively, when extended form an acute angle.

Fastening or locking means 32 are associated with each support arm 26a and 26b, respectively, to secure the scraper blades 14a and 14b, respectively, about their pivotal mounting so that the scraper blades are pivotally adjustable with respect to the feed roll 4. Such fastening means are well known in the art and one embodiment for use with multiple arms, is an inside threaded sleeve 34 which fits through an opening in the plate 30a. (This is equally true of plate 30b, but for simplification the following will be limited to only one of the similar support arms 26a and 26b.) A knurled cap 36 having a larger diameter than the opening in the plate 30a is unitary with or connected to by welding or any other known means, the top of the inside threaded sleeve 34. A threaded stud 38 is affixed by welding or other means, to the guide seat 38a of the roll mill 2, so that when the cooperating scraper blade 14a is placed in position on the feed roll 4, the inside threaded sleeve 34 will be axially aligned with the threaded stud 38. The threads of threaded stud 38 and inside threaded sleeve 34 are mating, thus the cooperating scraper blade 14a is secured in place by tightening the inside threaded sleeve 34 with the aid of the knurled cap 36 over the threaded stud 38.

Loss of the inside threaded sleeve 34 can be prevented by permanently securing it within the openings in plates 30a and 30b. This is accomplished by cutting a shallow annular groove sufficient to accept a retaining ring 40 therein, near the bottom edge of the inside threaded sleeve 34. The retaining ring 40 is snapped therein when the inside threaded sleeve 34 is in the plate opening. The retaining ring 40 must be such that when in place on the inside threaded sleeve 34 it is larger than the diameter of the opening in plates 30a and 30b. The inside threaded sleeve 34 retains its freedom of vertical movement in this manner permitting it to be advanced or retracted on the threaded stud 38. To prevent loosening of the inside threaded sleeve 34 from the threaded stud 38 during operation of the roll mill, a lock washer 42, having an inside diameter which is smaller than the outside diameter of the retaining ring 40 when in place on the inside threaded sleeve 34, can be placed onto the inside threaded sleeve 34 while in the plate opening and before the retaining ring is snapped on.

To prevent galling of the plates 30a and 30b by the adjacent portion of the knurled cap 36 when securing and unfastening the plates 30a and 30b from the roll mill, a thrust washer 44 can be fitted onto the inside threaded sleeve 34 adjacent the bottom of the knurled cap 36 before inserting the inside threaded sleeve 34 into the opening in the plates 30a and 30b. The thrust washer 44 can be of any soft material which has a lower coefficient of friction than the contacting surfaces, i.e., the knurled cap 36 and the plates 30a and 30b, for example, soft bronze, nylon or oil impregnated bronze.

When the ingredients are thoroughly milled, the plates 30a and 30b are unfastened from the roll mill and the cooperating scraper blades 14a and 14b are rotated up and away from the feed roll 4 to either side of the roll mill. A scraper which is well known in the art, is then placed across the axial length of the feed roll 4 and the product is separated from the feed roll 4 and allowed to drop into a pan 46 or other device used to collect the product. This method of collecting the product is well known in the art.

It is understood that the support arms 26a and 26b can be shaped in any manner which will permit them to conform to the geometry of the particular roll mill. For example, FIG. 5, shows support arm 26a adjacent the trailing edge of the scraper blade 14a having a portion of its foot narrowed to fit properly onto a particular roll mill.

It is also understood that multiple support arms 26a and 26b can include three or more support arms although only two have been shown in the drawings.

The advantages of cooperating scraper blades are not limited to small roll mills. Where the nip rolls are very long, more than one pair of cooperating scraper blades can be used successfully to accomplish the same job.

Obviously, many modifications and variations of the invention as hereinabove set forth, may be made without departing from the spirit and scope thereof, and therefore, only such limitations should be imposed as are indicated in the appended claims.

We claim:
1. A method of mixing a plurality of kneadable ingredients into a predetermined homogeneous product by the use of a pair of spaced apart rotating rolls onto which said ingredients are introduced and including a feed roll and a kneading roll, which comprises:
   (a) feeding a predetermined amount of ingredients into the nip of said rolls,
   (b) forcing said material through said nip,
   (c) retaining said material on the surface of said feed roll and away from said kneading roll as said material leaves said nip,
   (d) progressively lifting the outer portions of said feed roll,
   (e) folding said lifted portions upon themselves, and
   (f) forcing said folded ingredients through the nip of said rolls to knead said ingredients whereby said ingredients are intermixed and rekneaded by said mill rolls.

2. A method of mixing as defined in claim 1, in which the steps of lifting, folding and kneading are repeated a predetermined number of times, whereby said ingredients are mixed into a homogeneous product.

3. A method of mixing as defined in claim 2, which includes heating said feed roll and maintaining the surface of said material adjacent said feed roll in a tacky condition, thus causing said material to adhere to the surface of said feed roll upon leaving said nip.

4. A method of mixing as defined in claim 2, which includes rotating said kneading roll faster than said feed roll, thereby pushing said material toward said feed roll as it leaves said nip wherein said material was intimately milled and spread axially along said feed roll.

5. A method of mixing as defined in claim 1, in which said kneadable ingredients are a plastic, an antioxidant and a plasticizer.

6. In combination with a pair of mill rolls, a pair of oppositely angled cooperating scraper blades each comprising a share and a moldboard, said share having an edge adapted to the surface of the first of said rolls and positioned at an angle to the axis of said rolls so that said blades converge in the direction of rotation of said first roll, said moldboard being continuous with said share and curved toward the other of said blades, and heating means in said first roll whereby plastic material may be repetitively cycled about said first roll and said blades will fold and refold said plastic material during each cycle of rotation of said material through said mill rolls.

7. The combination as described in claim 6, and further characterized by drive means operationally driving said rolls, said second roll being driven at a greater surface velocity than said first roll.

8. The combination described in claim 7, wherein the pitch of said shares is the axial length of said feed roll.

9. The combination described in claim 6, in which each of said cooperating scraper blades are pivotally mounted adjacent said mill rolls, said cooperating scraper blades having locking means thereon for securing said cooperating scraper blades about said pivotal mounting whereby said cooperating scraper blades are pivotably adjustable with respect to said first roll.

10. The combination as described in claim 6, wherein said shares are spirally adapted to said surface of said first roll and the pitch of said shares is from ¾ to 1½ times the axial length of said first roll.

11. The combination described in claim 10, wherein the length from said leading to said trailing edge surfaces of said shares is less than one-half of the pitch of said shares.

12. The combination described in claim 11, wherein said length is 160° of a full pitch.

13. The combination described in claim 6, wherein said plane of said share forms an acute angle with a normal to the surface of said first roll.

14. The combination described in claim 6, wherein said scraper blades are formed from a 2½ inch right circular cylinder and said share is given a spiral twist from said leading edge to said trailing edge.

15. The combination described in claim 6, wherein said scraper blades have bevelled edges.

16. The combination described in claim 15, wherein the edges of said shares adjacent said first roll are bevelled to a knife edge.

17. The combination described in claim 16 in which said auxiliary scraper blade comprises:

(a) a share having a cutting edge which is complementary with a periphery of and adapted to fit said feed roll, the plane of the surface of said share being a spiral from the leading to the trailing edge thereof;

(b) a moldboard being continuous with said share and substantially flat; and (c) a stiff support wing connecting the top of said moldboard to one of said cooperating scraper blade moldboards.

18. The combination described in claim 17, wherein the pitch of said auxiliary scraper blade share is equal to the pitch of said cooperating scraper blade shares.

19. The combination described in claim 18, wherein the length of said share of said auxiliary scraper blade is between 30° and 120° of a full pitch.

20. The combination described in claim 17, wherein said length is 60° of a full pitch.

21. The combination described in claim 6, wherein an auxiliary scraper blade is located between said cooperating scraper blades and held in place relative thereto by a support wing cantilevered from the top of one of said moldboards and joined at its unsupported end to the top of said auxiliary scraper blade, whereby said ingredients adhering to the center portion of said first roll are separated therefrom and urged toward one of said cooperating scraper blades.

22. The combination described in claim 6, wherein said pair of cooperating scraper blades is coated with tetrafluoroethylene to prevent said ingredients separated from said feed roll from sticking to said cooperating scraper blades.

References Cited
UNITED STATES PATENTS

| | | | |
|---|---|---|---|
| 2,592,985 | 4/1952 | Walrafen | 18—2 |
| 2,995,774 | 8/1961 | Pasquetti | 18—2 |
| 3,169,270 | 2/1965 | Pass | 259—2X |
| 3,339,228 | 9/1967 | Seanor | 18—2 |

ROBERT W. JENKINS, Primary Examiner